United States Patent
Yi et al.

(10) Patent No.: US 9,088,719 B2
(45) Date of Patent: Jul. 21, 2015

(54) MOBILE TERMINAL FOR DISPLAYING AN IMAGE IN AN IMAGE CAPTURE MODE AND METHOD FOR CONTROLLING OF THE SAME

(71) Applicant: LG Electronics Inc., Seoul (KR)

(72) Inventors: Suhjin Yi, Seoul (KR); Yung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 13/691,387

(22) Filed: Nov. 30, 2012

(65) Prior Publication Data

US 2014/0071323 A1 Mar. 13, 2014

(30) Foreign Application Priority Data

Sep. 11, 2012 (KR) ........................ 10-2012-0100402

(51) Int. Cl.
| | |
|---|---|
| *H04N 5/222* | (2006.01) |
| *G06F 3/048* | (2013.01) |
| *H04N 5/76* | (2006.01) |
| *H04N 5/232* | (2006.01) |
| *G06F 3/0488* | (2013.01) |
| *G06F 3/0484* | (2013.01) |

(52) U.S. Cl.
CPC ........ *H04N 5/23293* (2013.01); *G06F 3/04842* (2013.01); *G06F 3/04883* (2013.01); *G06F 3/04886* (2013.01)

(58) Field of Classification Search
CPC ... H04N 5/23293; H04N 5/222; H04N 5/272; H04N 5/45; H04N 5/772; G06F 1/1643; G06F 1/1647; G06F 19/3406; G06F 3/017

USPC .............. 348/333.01–333.13, 231.1–231.99; 715/700–838
See application file for complete search history.

(56) References Cited

U.S. PATENT DOCUMENTS

| | | | | |
|---|---|---|---|---|
| 6,686,958 | B1 * | 2/2004 | Watanabe et al. ........... | 348/231.1 |
| 7,369,164 | B2 * | 5/2008 | Parulski et al. .......... | 348/231.99 |
| 7,430,008 | B2 * | 9/2008 | Ambiru et al. ............ | 348/333.12 |
| 7,471,890 | B2 * | 12/2008 | Lee et al. ....................... | 396/287 |
| 7,714,926 | B2 * | 5/2010 | Kobayashi et al. ....... | 348/333.11 |
| 7,821,563 | B2 * | 10/2010 | Tanaka ..................... | 348/333.12 |
| 2003/0164890 | A1 * | 9/2003 | Ejima et al. ................ | 348/333.1 |
| 2007/0091194 | A1 * | 4/2007 | Kwak ....................... | 348/333.01 |
| 2009/0237547 | A1 * | 9/2009 | Misawa et al. ........... | 348/333.01 |
| 2010/0026873 | A1 * | 2/2010 | Lee .......................... | 348/333.05 |
| 2010/0027958 | A1 * | 2/2010 | Ubillos ........................... | 386/4 |
| 2010/0110228 | A1 * | 5/2010 | Ozawa et al. .............. | 348/231.2 |
| 2010/0231752 | A1 * | 9/2010 | Lodge ........................ | 348/231.4 |

(Continued)

FOREIGN PATENT DOCUMENTS

CN 102197398 A 9/2011

*Primary Examiner* — Chia-Wei A Chen
(74) *Attorney, Agent, or Firm* — Birch, Stewart, Kolasch & Birch, LLP

(57) ABSTRACT

A mobile terminal including a camera; a touchscreen; a memory configured to store at least one image captured through the camera; and a controller configured to enter an image capture mode and display on the touchscreen a preview image obtained through the camera, display in a predetermined area a thumbnail image of a most recently captured image stored in the memory, receive a predetermined touch input on the thumbnail image, and display the most recently captured image corresponding to the thumbnail image while maintaining the image capture mode, based on the received predetermined touch input.

14 Claims, 24 Drawing Sheets

(56) References Cited

U.S. PATENT DOCUMENTS

| | | |
|---|---|---|
| 2011/0026901 A1 | 2/2011 | Kashima |
| 2011/0074809 A1* | 3/2011 | Chen et al. .................... 345/619 |
| 2011/0141218 A1 | 6/2011 | Stancato |
| 2011/0149138 A1* | 6/2011 | Watkins et al. .......... 348/333.02 |
| 2011/0175830 A1* | 7/2011 | Miyazawa et al. ............ 345/173 |
| 2011/0193881 A1* | 8/2011 | Rydenhag .................... 345/647 |
| 2011/0304760 A1* | 12/2011 | Lee et al. ................. 348/333.05 |
| 2012/0056832 A1* | 3/2012 | Miyazaki et al. ............. 345/173 |
| 2012/0169768 A1* | 7/2012 | Roth et al. ................... 345/629 |
| 2012/0180001 A1* | 7/2012 | Griffin et al. ................ 715/863 |
| 2012/0185768 A1* | 7/2012 | Dowd .......................... 715/702 |
| 2012/0188155 A1* | 7/2012 | Eun et al. ...................... 345/156 |
| 2012/0198386 A1* | 8/2012 | Hautala ........................ 715/838 |
| 2012/0235930 A1* | 9/2012 | Lazaridis et al. ............. 345/173 |
| 2012/0300259 A1* | 11/2012 | Hosaka et al. ............... 358/1.15 |
| 2013/0010170 A1* | 1/2013 | Matsuzawa et al. ..... 348/333.01 |
| 2013/0113871 A1* | 5/2013 | Ballantyne et al. ......... 348/14.05 |
| 2013/0222663 A1* | 8/2013 | Rydenhag et al. ....... 348/333.01 |
| 2013/0222666 A1* | 8/2013 | Rydenhag et al. ....... 348/333.02 |
| 2013/0236093 A1* | 9/2013 | Gatt et al. .................... 382/167 |
| 2013/0321340 A1* | 12/2013 | Seo et al. ...................... 345/174 |
| 2014/0104456 A1* | 4/2014 | Wang et al. ................ 348/231.2 |
| 2014/0333567 A1* | 11/2014 | Mukai et al. ................. 345/173 |

* cited by examiner

MOBILE TERMINAL FOR DISPLAYING AN IMAGE IN AN IMAGE CAPTURE MODE AND METHOD FOR CONTROLLING OF THE SAME

CROSS-REFERENCE TO RELATED APPLICATIONS

Pursuant to 35 U.S.C. §119(a), this application claims the benefit of earlier filing date and right of priority to Korean Patent Application No. 10-2012-0100402, filed on 11 Sep. 2012, the contents of which are incorporated by reference herein in their entirety.

BACKGROUND OF THE INVENTION

1. Field of the Invention

The present invention relates to a mobile terminal and corresponding method for display a preview image and captured images more efficiently.

2. Discussion of the Related Art

Electronic devices such as mobile terminal now provide a variety of functions besides the basic call function. Mobile terminals also include touchscreens allowing the user to easily access information displayed on the display unit.

SUMMARY OF THE INVENTION

Accordingly, one object of the present invention is to provide a mobile terminal and corresponding method for displaying preview and captured images through a quick viewer without exiting an image capture mode.

To achieve these and other advantages and in accordance with the purpose of the present invention, as embodied and broadly described herein, the present invention provides in one aspect a mobile terminal including a camera; a touchscreen; a memory configured to store at least one image captured through the camera; and a controller configured to enter an image capture mode and display on the touchscreen a preview image obtained through the camera, display in a predetermined area a thumbnail image of a most recently captured image stored in the memory, receive a predetermined touch input on the thumbnail image, and display the most recently captured image corresponding to the thumbnail image while maintaining the image capture mode, based on the received predetermined touch input. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. The mobile terminal described in the specification can include a cellular phone, a smart phone, a laptop computer, a digital broadcasting terminal, personal digital assistants (PDA), a portable multimedia player (PMP), a navigation system and so on.

Figure 1:
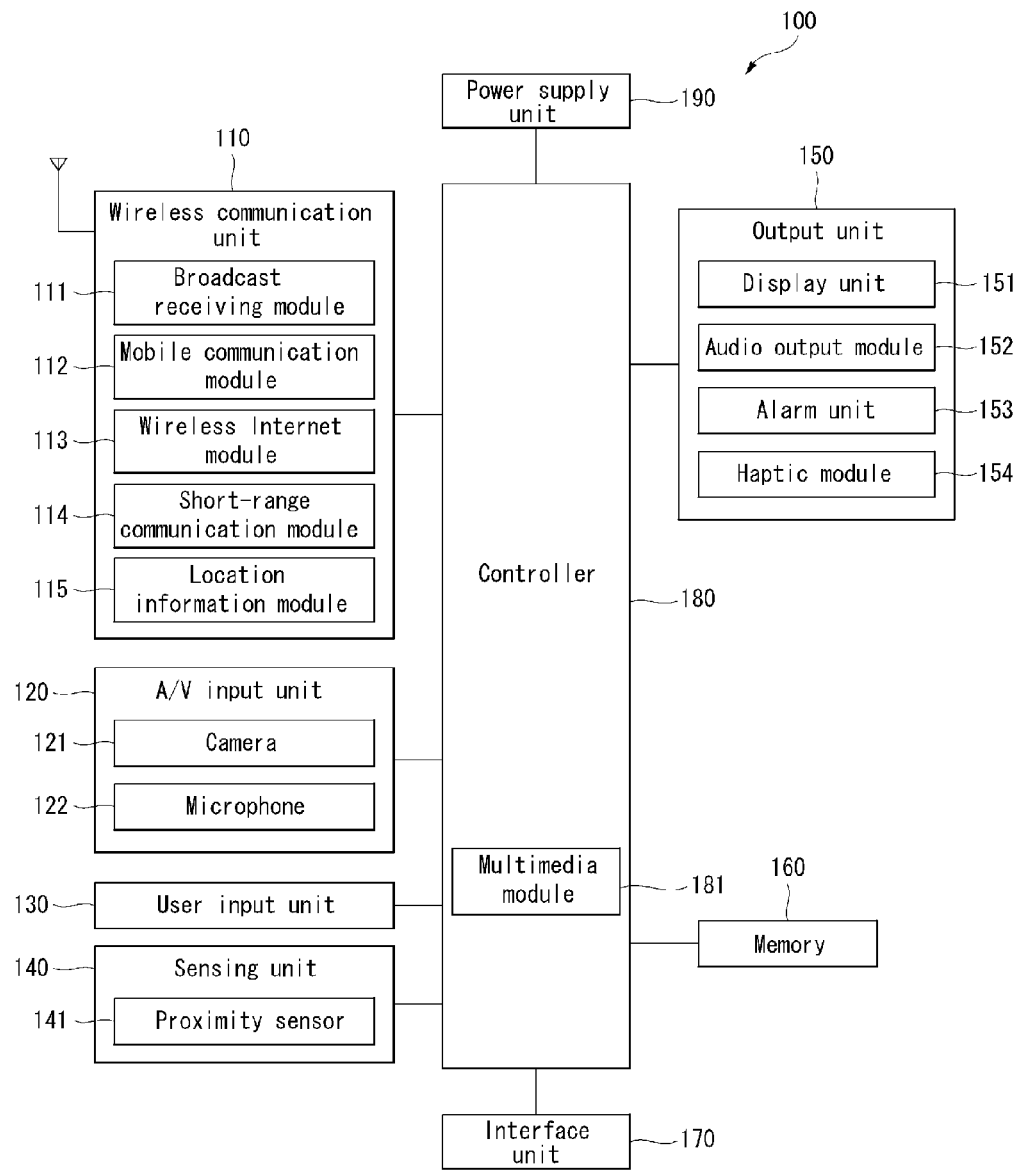
FIG. 1 is a block diagram of a mobile terminal according to an embodiment of the present invention.

Referring to FIG. 1, a mobile terminal 100, as one example of the electronic device 100 related to this invention, includes a wireless communication unit 110, an audio/video (AN) input unit 120, a user input unit 130, a sensing unit 140, an output unit 150, a memory 160, an interface unit 170, a controller 180, and a power supply unit 190. Although FIG. 1 shows the mobile terminal 100 having various components, implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and the wired communication unit may be commonly referred to as a communication unit. /

The broadcast receiving module 111 receives a broadcast signal and/or broadcast associated information from an external broadcast managing entity via a broadcast channel. The broadcast channel may include a satellite channel and/or a terrestrial channel.

The broadcast managing entity refers to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also be used. The position-location module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 can detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 can sense whether a sliding portion of the mobile terminal 100 is opened or closed. The sensing unit 140 can also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller. The touch controller processes the signal(s) and then transfers corresponding data to the controller 180. The controller 180 may determine, therefore, which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The controller 180 recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory(PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 generally controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

For the convenience of description, the present invention assumes that the display unit 151 is a touchscreen 151. As described above, the touchscreen 151 can perform both of an information display and an information input function. However, the present invention is not limited to the above. Also, touch introduced in this document may include both types of contact touch and proximity touch.

Figure 2:
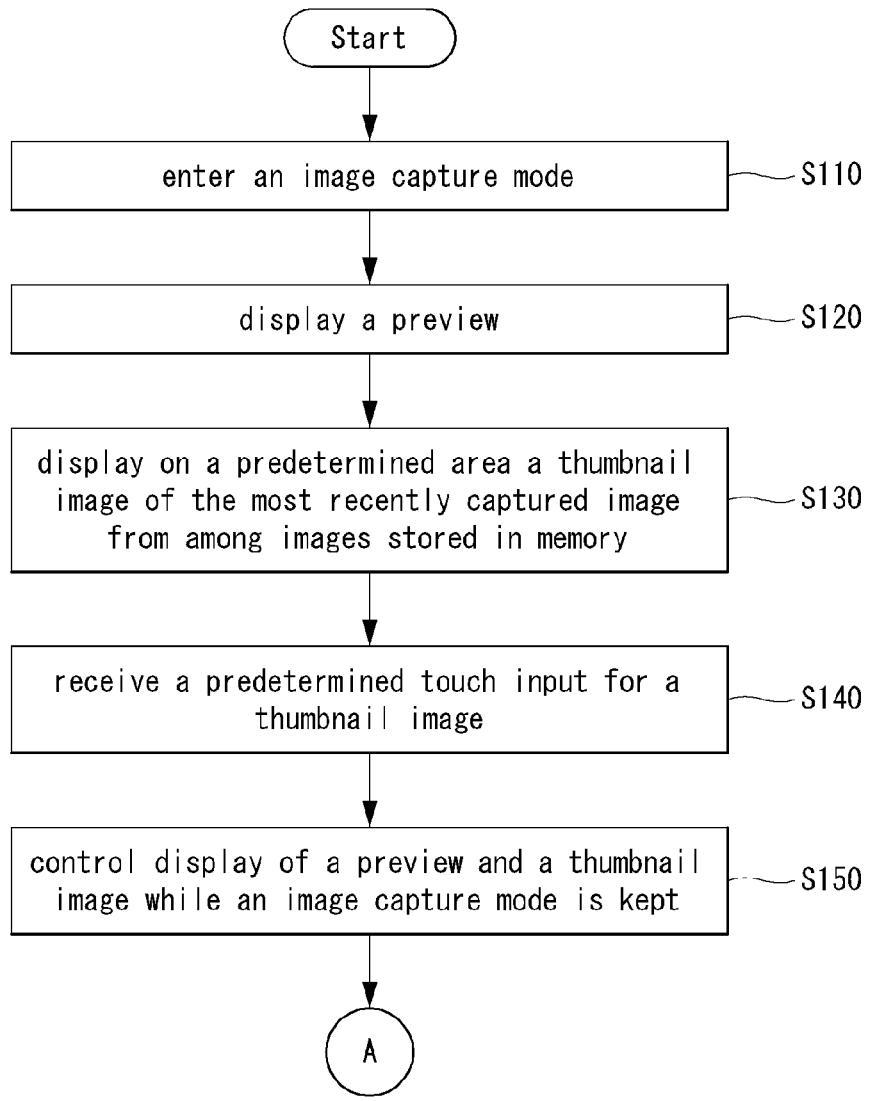
FIG. 2 is a flow chart illustrating a method of controlling a mobile terminal according to a first embodiment of the present invention.

FIG. 2 is a flow chart illustrating a method of controlling a mobile terminal according to a first embodiment of the present invention. As shown, the controller 180 controls the mobile terminal 100 to enter an image capture mode as the camera 121 is operated (S110).

The controller 180 can display on the touchscreen 151 a user interface including at least one soft function button for controlling a preview image input to the camera 121 and image capture in the image capture mode. Here, the preview image is an image input to the camera 121, which is shown before an image input to the camera 121 is stored in the memory 160 (e.g., before the image is captured).

In the embodiments of the present invention, different from the preview image, an image captured through the camera 121 and stored in the memory 160 is provided as a quick view through a quick viewer application while the image capture mode is maintained. In other words, the controller 180 opens a gallery folder and the like in which captured images are stored, and displays images stored in the memory 160 through the quick viewer without searching the gallery folder for a desired image while in the image capture mode.

The controller 180 also displays a preview image in the image capture mode (S120). Further, the controller 180 displays on a predetermined area a thumbnail image of the most recently captured image from among images stored in the memory 160 (S130).

Therefore, while in the image capture mode, the controller 180 displays both the preview image and the thumbnail image on a user interface meant for capturing an image. The predetermined area can overlap with one part of the preview screen. More specifically, the predetermined area can be displayed at least in one part of a control area for controlling an image capture in the image capture mode. Further, the size of the predetermined area can be smaller than the size of a preview area in the touchscreen 151.

Meanwhile, if an image is captured through the camera 121, the controller 180 can not only store the captured image in the memory 160 but also display a thumbnail image of the captured image in the predetermined area. Therefore, the thumbnail image displayed in the predetermined area can be changed each time an image is captured.

The controller 180 also receives a predetermined touch input for the thumbnail image (S140). The controller 180 then controls the display of the preview image and an image corresponding to the thumbnail image while in the image capture mode (S150).

Further, the predetermined touch input is an input for displaying the quick viewer and includes an input maintained for a predetermined time period. For example, when a touch input on the thumbnail image is received, the controller 180 can provide a quick view corresponding to the thumbnail image on the touch screen 151 through a quick viewer application during the predetermined time period.

At this time, as the image capture mode has not been terminated yet, the controller 180 can display the quick view overlapping with the preview image while the preview image is being displayed in the touch screen 151.

The quick viewer may also be displayed across or on the entire area of the touchscreen 151. Also, for example, the quick viewer can be displayed to overlap with at least one part of the preview image displayed on the touchscreen 151.

In addition, the quick viewer can form an independent frame different from the user interface displayed on the touchscreen 151 in the image capture mode. Accordingly, the quick viewer can include at least one soft button corresponding to a function for controlling and displaying a quick view image.

Figure 3:
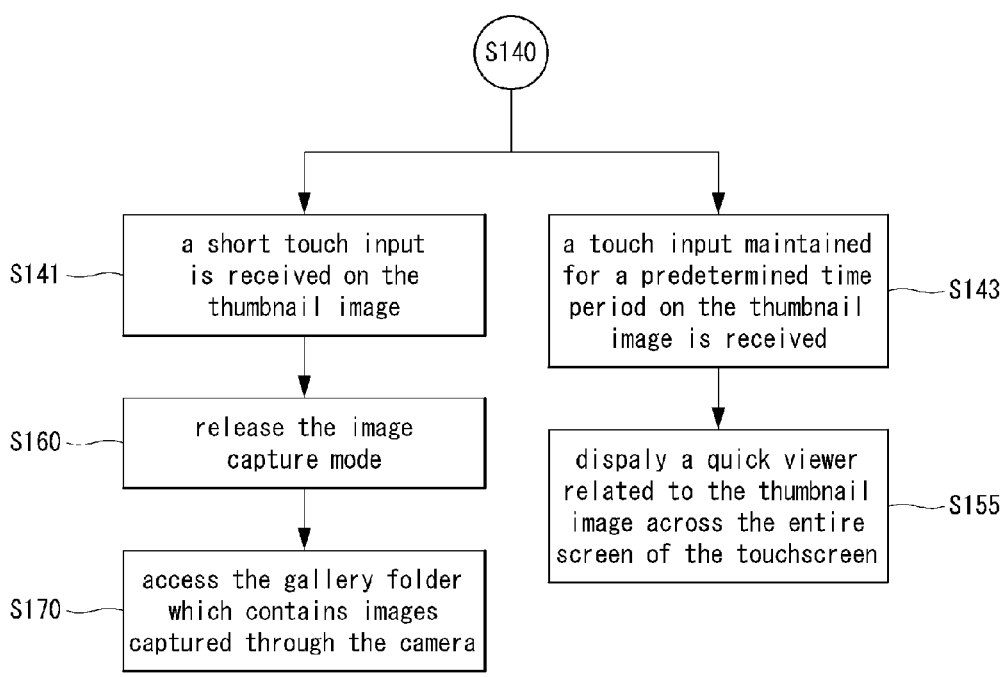
FIG. 3 is a flow illustrating in more detail a method of controlling a mobile terminal according to the first embodiment of the present invention.

The first embodiment of the present invention will be described in more detail with reference to FIG. 3. With reference to FIG. 3, a predetermined touch input on a thumbnail image (Th of FIG. 4) is divided into a simple touch input and a long touch input. Because the thumbnail image is obtained by reducing the size of the corresponding image captured previously through the camera 121, the image corresponding to the thumbnail image can be considered to have been already stored in the memory 160.

When a simple touch input on the thumbnail image, for example, a short touch input is received (S141), the controller 180 accesses a gallery folder which contains an image corresponding to the thumbnail image. Then, after the short touch input, the controller 180 terminates the camera application and releases the image capture mode to access the gallery folder (S160).

Next, the controller 180 accesses the gallery folder which contains images captured through the camera 121 (S170) and displays the image corresponding to the thumbnail image on the touchscreen 151.

However, for a long touch input on the thumbnail image, for example, a touch input maintained for a predetermined time period on the thumbnail image is received (S143), the controller 180 displays a quick viewer related to the thumbnail image across the entire screen of the touchscreen 151 (S155).

If the long touch input is released, the controller 180 can remove the quick viewer from the touchscreen 151 and recover the state of the mobile terminal 100 to that before the touch input on the thumbnail image is received.

Figure 4:
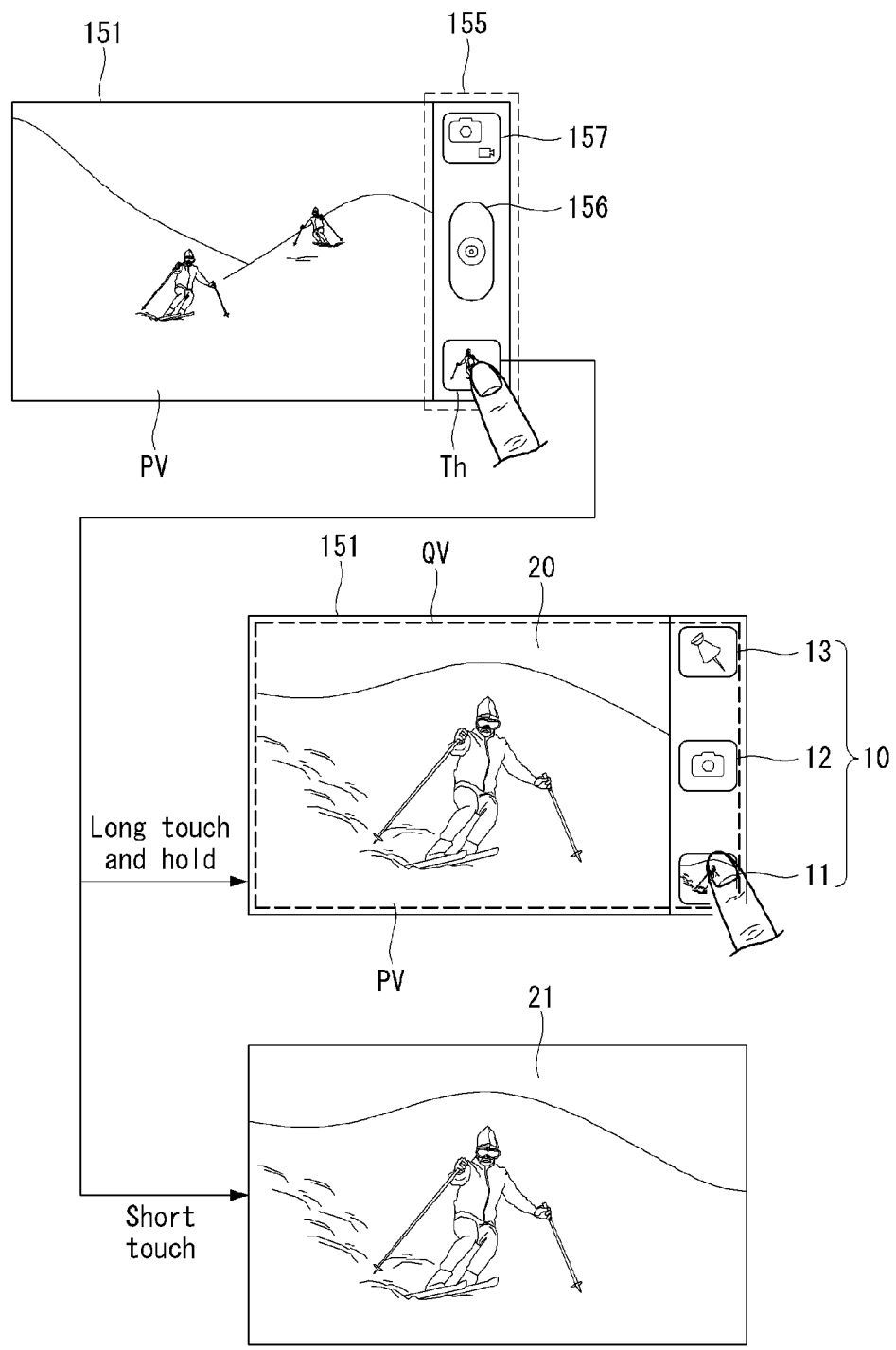
FIGS. 4 and 5 are display screens illustrating a method of controlling a mobile terminal according to the first embodiment of the present invention.

Next, with reference to FIG. 4, as the controller 180 enters the image capture mode, a preview image input to the camera 121 is displayed on the touchscreen 151. The controller 180 also displays a control area 155 including options for controlling the image capture together with the preview image in the image capture mode. As shown, the control area 155 includes a soft button 156 corresponding to an image capture function and a soft button 157 corresponding to a function for selecting a still image capture mode or a video image mode.

Also, the control area 155 includes an area in which displayed is a thumbnail image (Th) of the most recently captured image from among images captured through the camera 121 and stored in the memory 160 (a particular gallery folder).

With continued reference to FIG. 4, when a touch input on the thumbnail image (Th) is received and the touch input is maintained for a predetermined time period, the controller 180 additionally operates a quick view mode while the image capture mode is maintained.

In other words, the controller 180 displays an image 20 corresponding to a thumbnail image (Th) as a quick viewer (QV) through the quick view mode. The quick viewer (QV) can be provided as a separate frame and in this example includes a soft buttons 12 and 13 corresponding to at least one control function for controlling the display of the quick view image 20 corresponding to the thumbnail image, a thumbnail image 11 of the quick view image, and the quick view image 20.

Meanwhile, when the long touch input on the thumbnail image (Th) is kept continuously, the thumbnail image (Th) for which the long touch input is received is displayed on a position corresponding to the quick viewer (QV) while the long touch input is maintained. When the long touch input is released, the controller 180 removes the quick viewer (QV) from the touchscreen 151.

If receiving a simple touch input (for example, a touch release after a touch) for the thumbnail image (Th), the controller 180 releases the image capture mode and accesses a gallery folder in which the image corresponding to the thumbnail image (Th) is stored. The controller 180 also displays an image 21 corresponding to the thumbnail image (Th) on the touchscreen 151.

Figure 5:
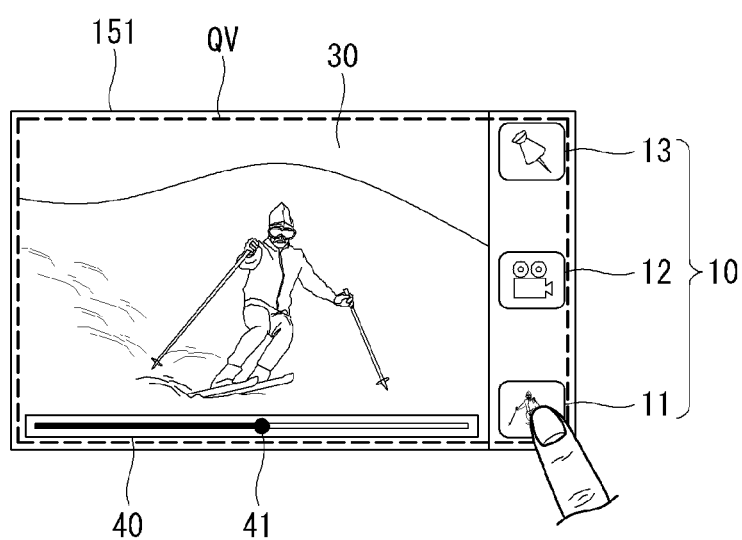

In addition, the thumbnail image (Th) is not limited to a still image. That is, a video can also be represented as an image corresponding to the thumbnail image (Th). In more detail, with reference to FIG. 5, the controller 180 stores a video captured through the camera 121 in the memory 160 and displays a thumbnail image of the video stored on a user interface in the image capture mode.

The controller 180 also displays a quick viewer (QV) including a video play screen 30 on the touchscreen 151 while a long touch input is maintained for the thumbnail image corresponding to the captured video.

The video play screen 30 in this example also displays a progress bar 40 for controlling the video play. Meanwhile, the user can control video play touch dragging a play header 41 of the progress bar 40 in the left and right direction is received while a long touch input is maintained for the thumbnail image 11.

Figure 6:
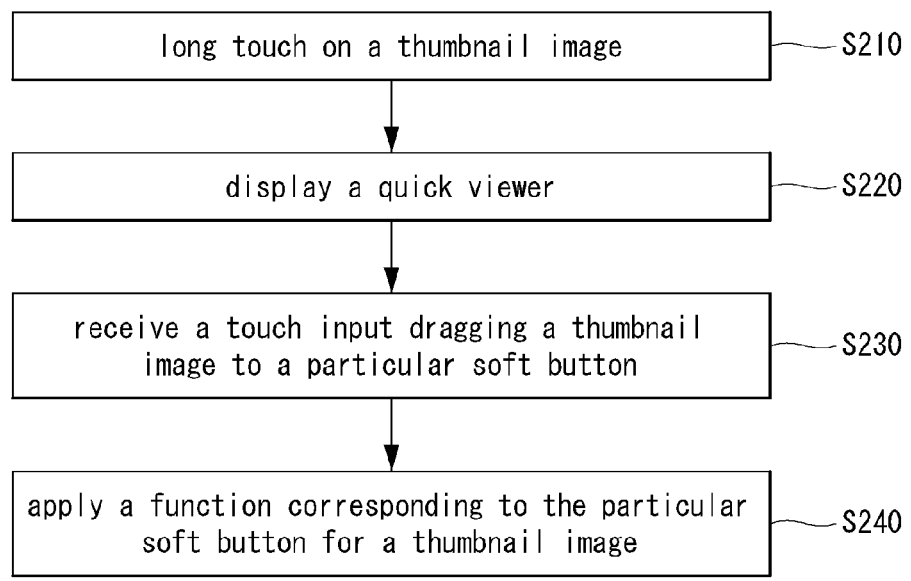
FIG. 6 is a flow chart illustrating a method of controlling a mobile terminal according to a second embodiment of the present invention.

Next, FIG. 6 is a flow chart illustrating a method of controlling a mobile terminal according to a second embodiment of the present invention. With reference to FIG. 6, the controller 180 receives a predetermined touch input (for example, a long touch input) for a thumbnail image (S210).

The controller 180 then displays a quick viewer on the touchscreen 151 in response to the predetermined touch input (S220). As described above, the quick viewer may include at least one soft button corresponding to a function for controlling display a quick view image included in the quick viewer.

Then, when the user drags a thumbnail image to a particular soft button (S230), the controller 180 applies a function corresponding to the particular soft button to the thumbnail image (S240).

Figure 7:
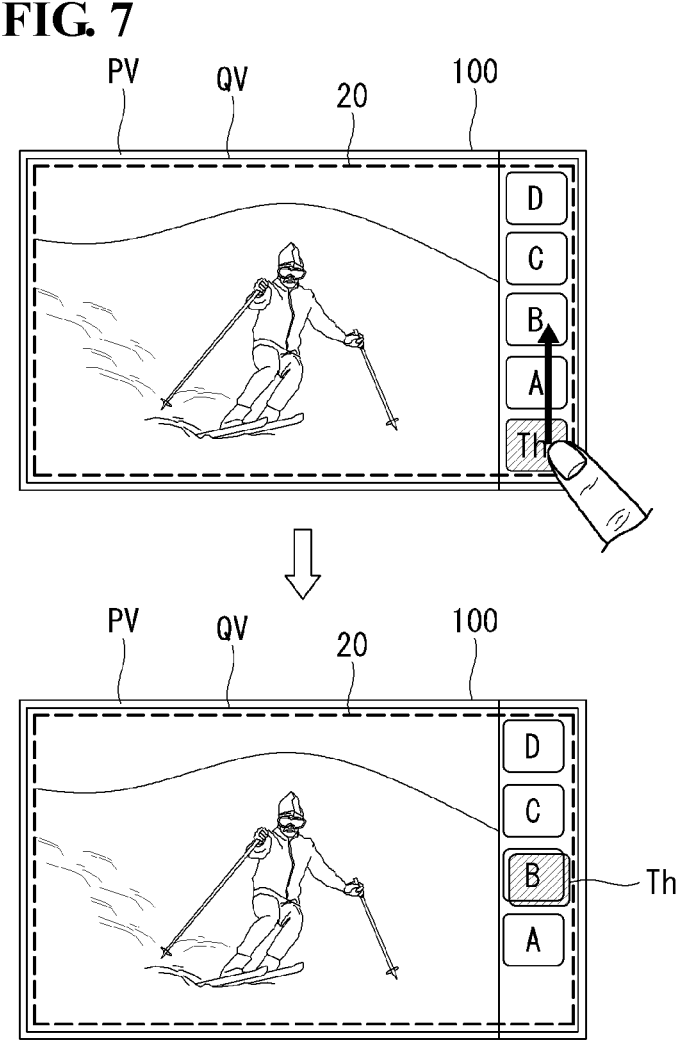
FIGS. 7 to 14 are display screens illustrating a method of controlling a mobile terminal according to the second embodiment of the present invention.

In more detail, with reference to FIG. 7, when receiving a predetermined touch input on a thumbnail image, the controller 180 displays a quick viewer (QV) while a preview image (PV) is being displayed. The quick viewer (QV) in this example includes soft buttons (A, B, C, D) for controlling the display of a quick view image. The functions for controlling the display of the quick view image 20 include image capture, image share, and image delete; image capture function extended from an image corresponding to the quick view image; and an activating function for activating a speech recognition module for tagging a predetermined voice to the quick view image, among other functions.

When the thumbnail is dragged to the soft button (B), the controller 180 applies a function corresponding to the soft button (B) to the thumbnail image (Th).

Figure 8:
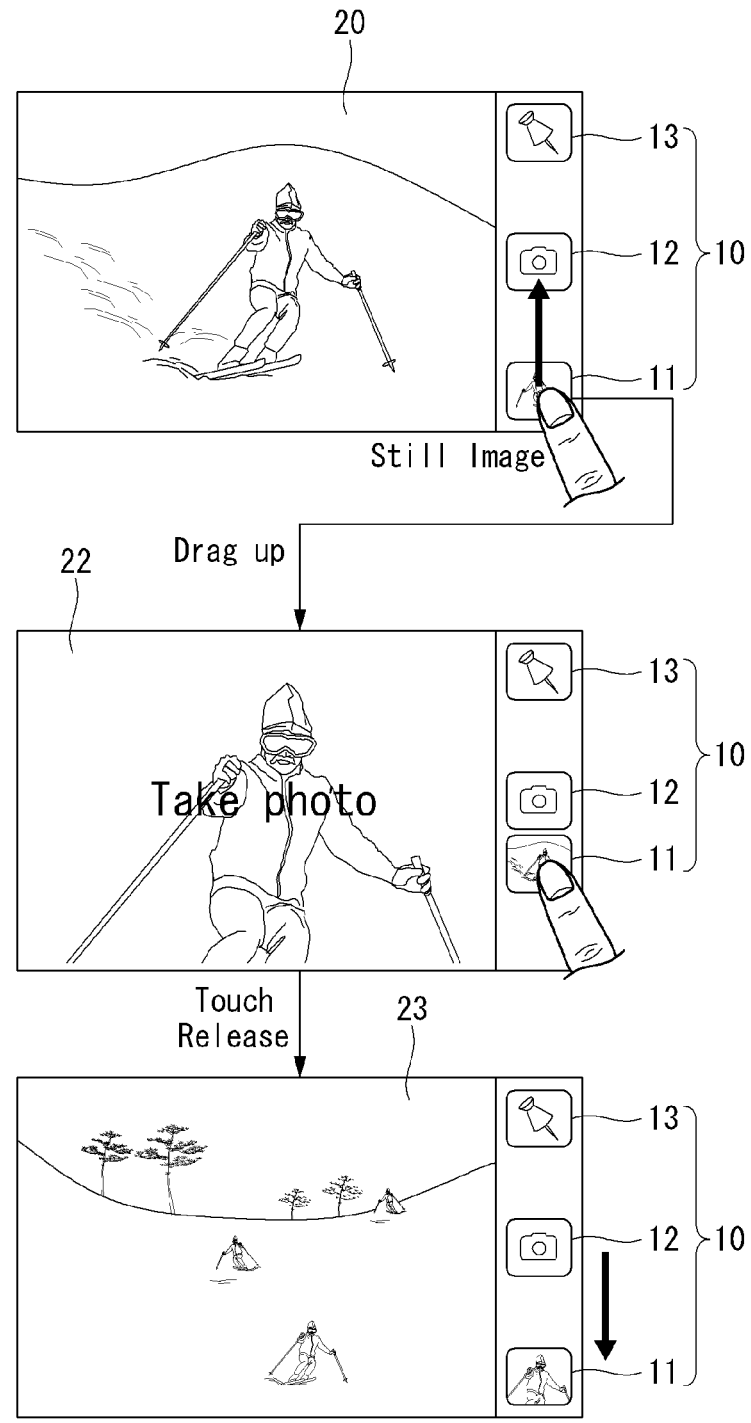

FIG. 8 illustrates the particular soft button being associated with a function for capturing images. With reference to FIG. 8, when the thumbnail image 11 is dragged to the capture function button 12, the controller 180 performs an image capture operation 22.

When the touch input on the thumbnail image 11 is released, the thumbnail image 11 is recovered to its original position. Meanwhile, the controller 180 can display a thumbnail image 11 of a previously captured image and a quick view image 23 of a newly captured image on the quick viewer (QV).

In addition, according to one embodiment, the capture function button 12 can provide a function of continuous capture with a predetermined time interval while a touch input is maintained. For example, when the thumbnail image 11 is dragged to the capture function button 12, the controller 180 can capture a plurality of images continuously for a predetermined time period while the touch input is being maintained. When the touch input is released, the controller 180 can generate a representative image from among the plurality of captured images as a thumbnail image.

Figure 9:
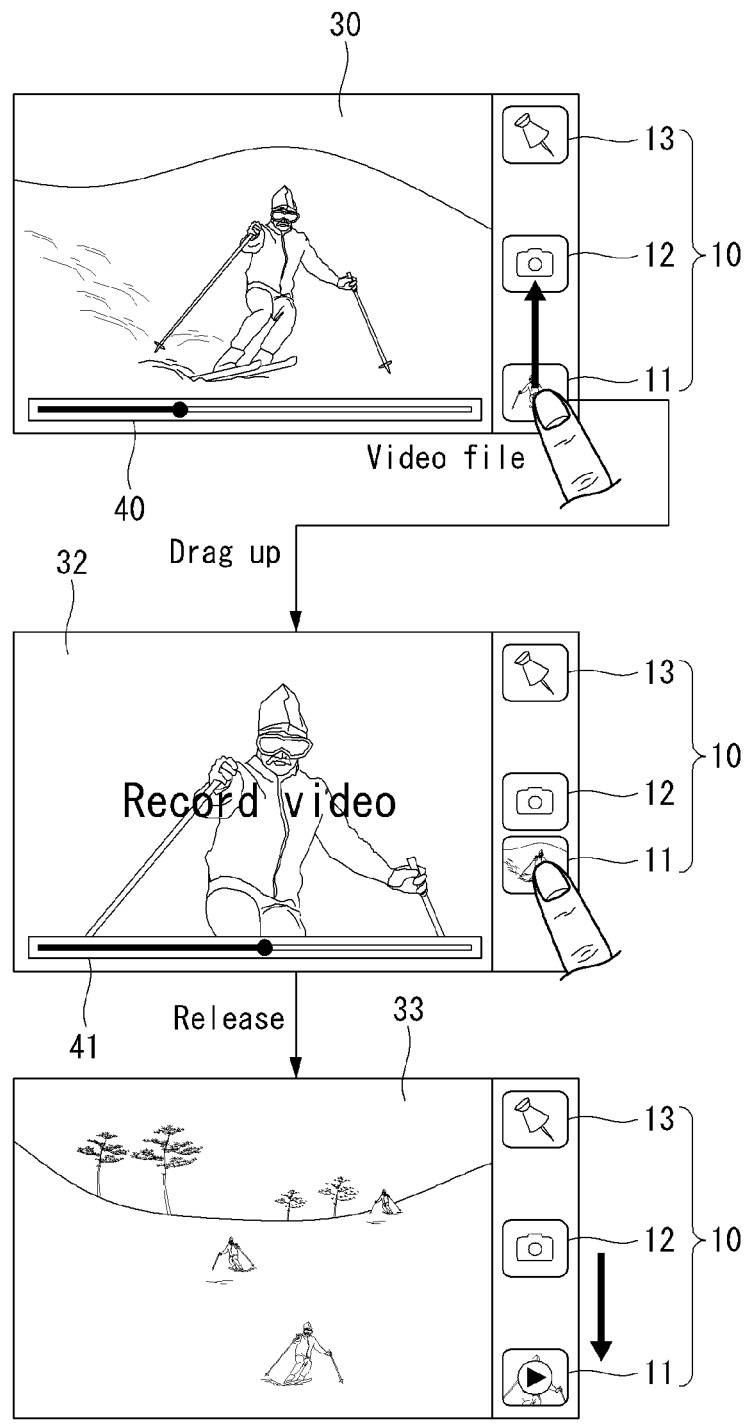

Next, FIG. 9 is a display screen illustrating an image corresponding to a thumbnail image being a video. With reference to FIG. 9, if the thumbnail image 11 is dragged toward the capture function button 12, the controller 180 captures the video 32. Also, according to one embodiment, the controller 180 can generate a new video file by synthesizing a video generated by the additional video capture and a video corresponding to the thumbnail image.

Meanwhile, the controller 180 can display a thumbnail image 11 of a previously captured video and a quick view image 33 of a newly captured video on the quick viewer (QV).

Figure 10:
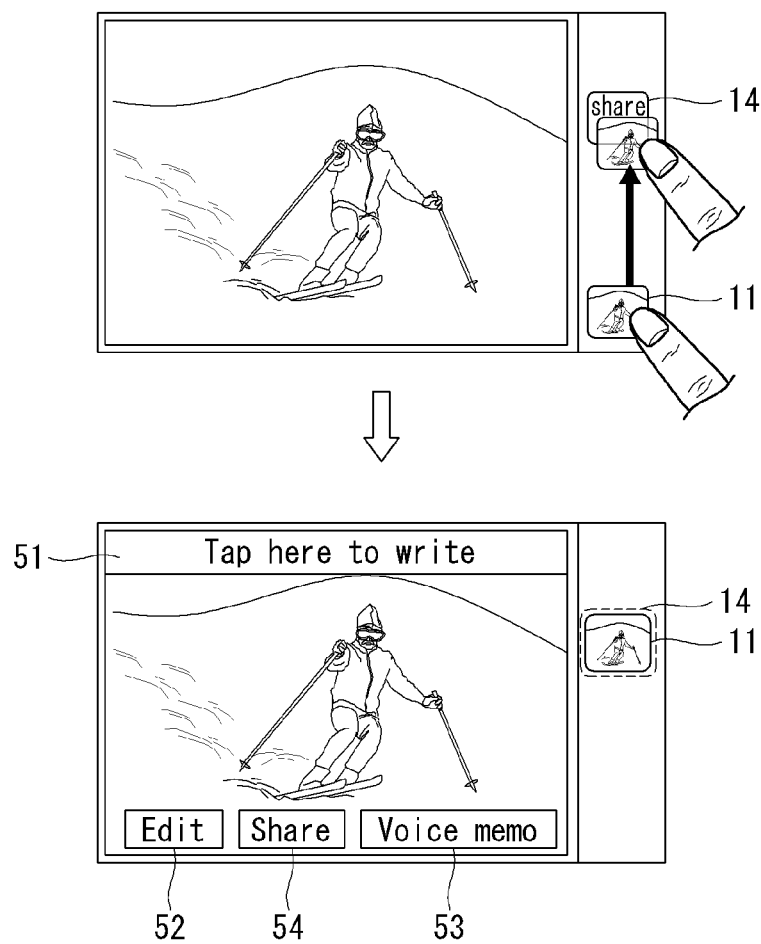

Next, FIG. 10 is a display screen illustrating the particular soft button providing a sharing function for sharing the thumbnail image with an external device. With reference to FIG. 10, when the thumbnail image 11 is dragged to a share function button 14, the controller 180 displays a user interface including options 51, 52, 53, 54 for sharing an image corresponding to the thumbnail image with an external device along with a quick viewer (QV).

In particular, the user interface includes an option 51 for receiving a text input, an option 52 for editing the quick view image, an option 53 for tagging a predetermined voice to the quick view image, and an option 54 for sharing an image with external devices.

Figure 11:
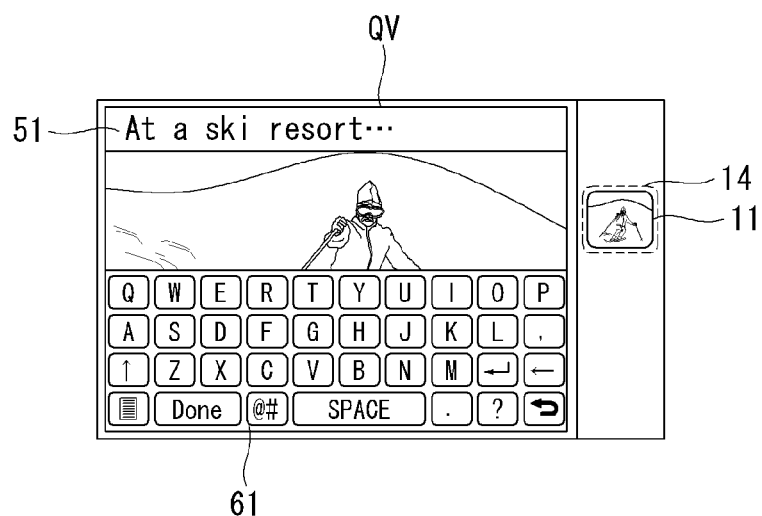

Next, FIGS. 11 to 14 include display screens illustrating a specific example where the quick viewer (QV) includes a user interface with a share function. In particular, FIG. 11 illustrates an example where the controller 180 displays a keypad 61 for inputting text on the quick viewer (QV) when the option 51 is selected in FIG. 10.

Figure 12:
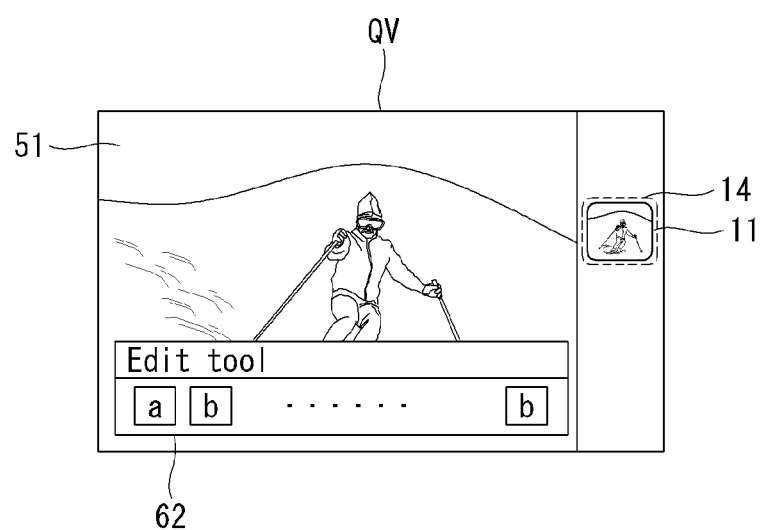

FIG. 12 illustrates an example where the controller 180 displays a menu 62 including at least one edit tool (a, b, . . . , n) on the quick viewer (QV) when the option 52 for editing the quick view image 20 is selected in FIG. 10.

Figure 13:
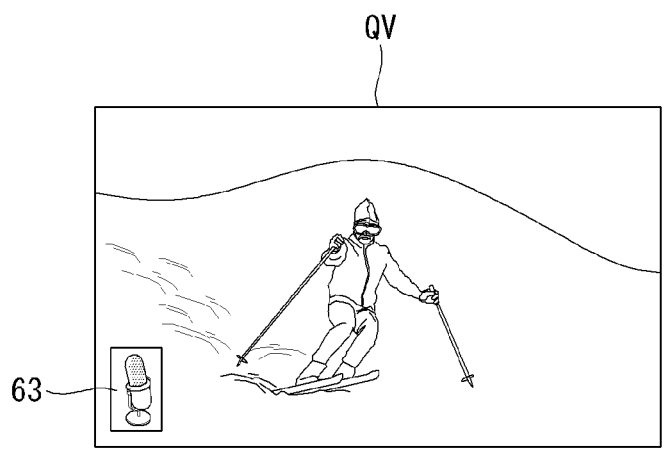

FIG. 13 illustrates an example where the controller 180 switches to a voice input mode and displays an icon 63 indicating the availability of voice recording on the quick viewer (QV) when the option 53 for tagging a predetermined voice to the quick view image is selected in FIG. 10.

Figure 14:
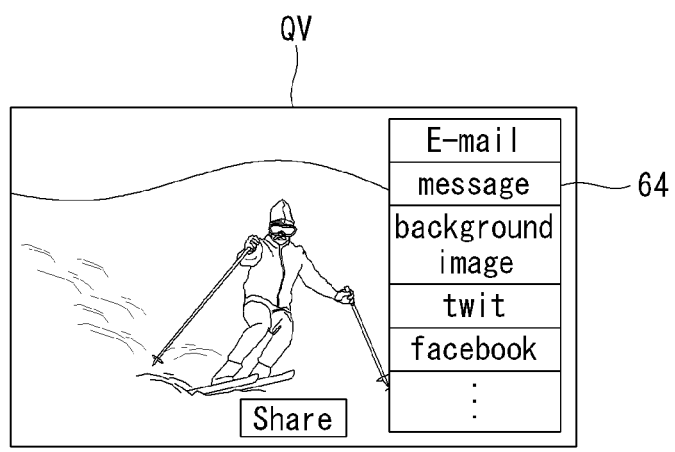

FIG. 14 illustrates an example where the controller 180 displays a menu 64 on the quick view (QV) including at least one application for sharing the quick view image 20 when the option 54 for sharing with an external device is selected.

Figure 15:
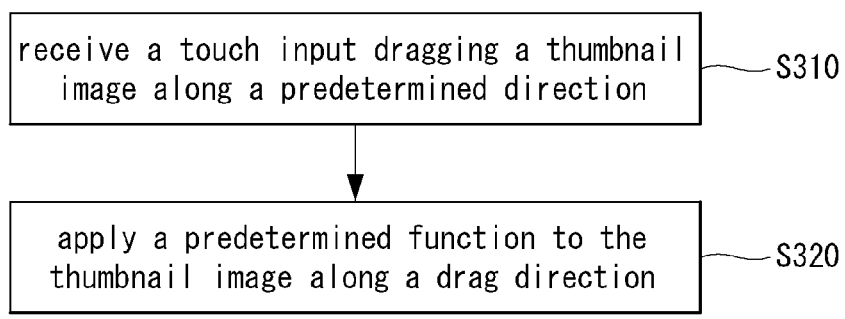
FIG. 15 is a flow chart illustrating a method of controlling a mobile terminal according to a third embodiment of the present invention.

Next, FIG. 15 is a flow chart illustrating a method of controlling a mobile terminal according to a third embodiment of the present invention. With reference to FIG. 15, the controller 180 receives a touch input dragging a thumbnail image along a predetermined direction (S310). The controller 180 then applies a predetermined function to the thumbnail image along the direction of drag input (S320).

Figure 16:
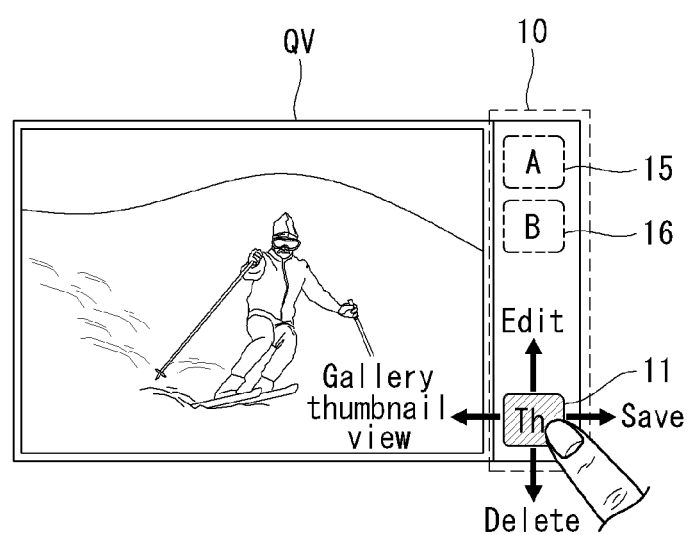
FIGS. 16 to 19 are display screens illustrating a method of controlling a mobile terminal according to the third embodiment of the present invention.

In more detail, FIG. 16 illustrates the functions corresponding to an up, down, left, and right direction being pre-assigned around the thumbnail image 11. Further, the functions corresponding to the respective directions can be predetermined and/or changed by the user.

As shown in the example in FIG. 16, the upward direction with respect to the thumbnail image 11 is assigned an edit function, the downward direction is assigned a delete function, the right direction is assigned a storing function, and the left direction is assigned a function for viewing thumbnails of images stored in a gallery folder.

Figure 17:
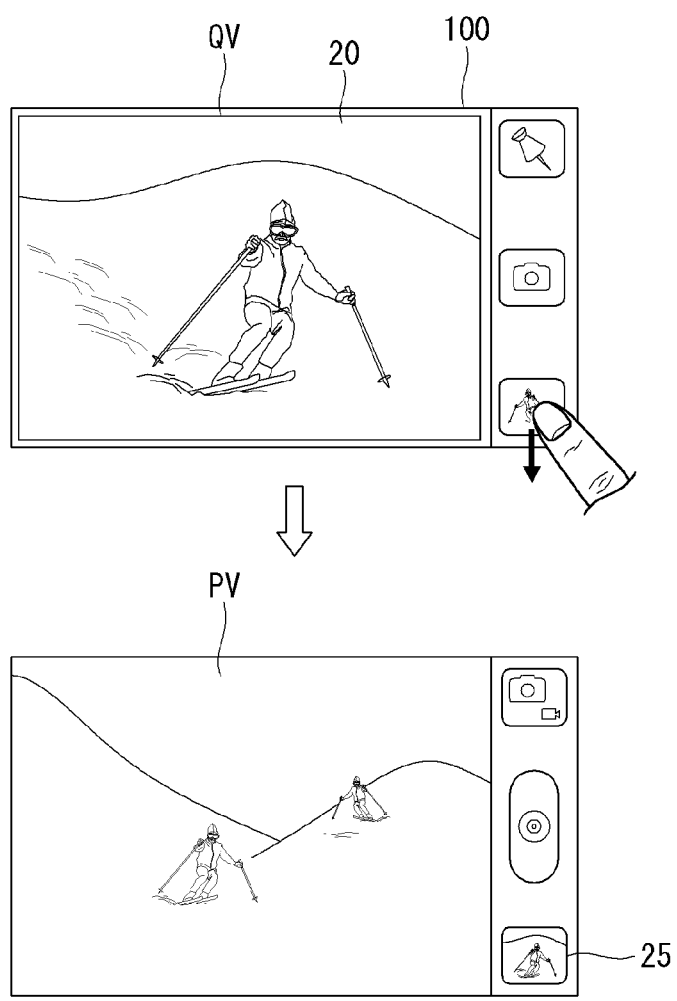

With reference to FIG. 17, when receiving a touch input dragging a thumbnail image in a downward direction of a quick viewer (QV), the controller removes a quick view image 20 included in the quick viewer (QV) from the memory 160. Since the removed image is a thumbnail of the most recently captured image, a thumbnail 25 of an image captured prior to the removed image is displayed on a thumbnail image display area.

Figure 18:
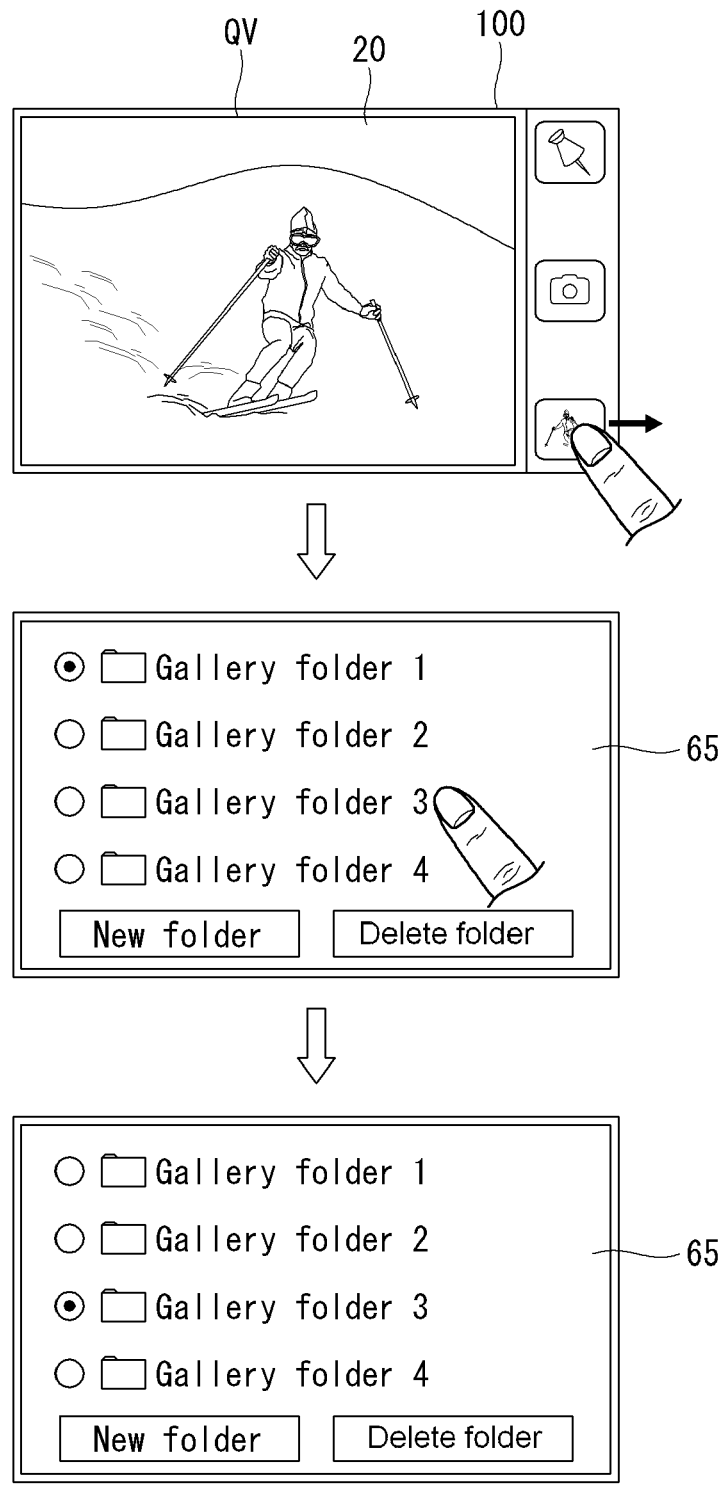

With reference to FIG. 18, when receiving a touch input dragging a thumbnail image to a right direction of the quick viewer (QV), the controller 180 displays on the quick viewer (QV) a menu 65 including at least one folder item for setting up an area to which an image corresponding to the thumbnail image is stored.

In addition, the controller 180 stores the quick view image 20 in a folder selected from the at least one folder item. In other words, according to the third embodiment of the present invention, while the image capture mode is image, a quick view image can be stored in a predetermined folder.

Figure 19:
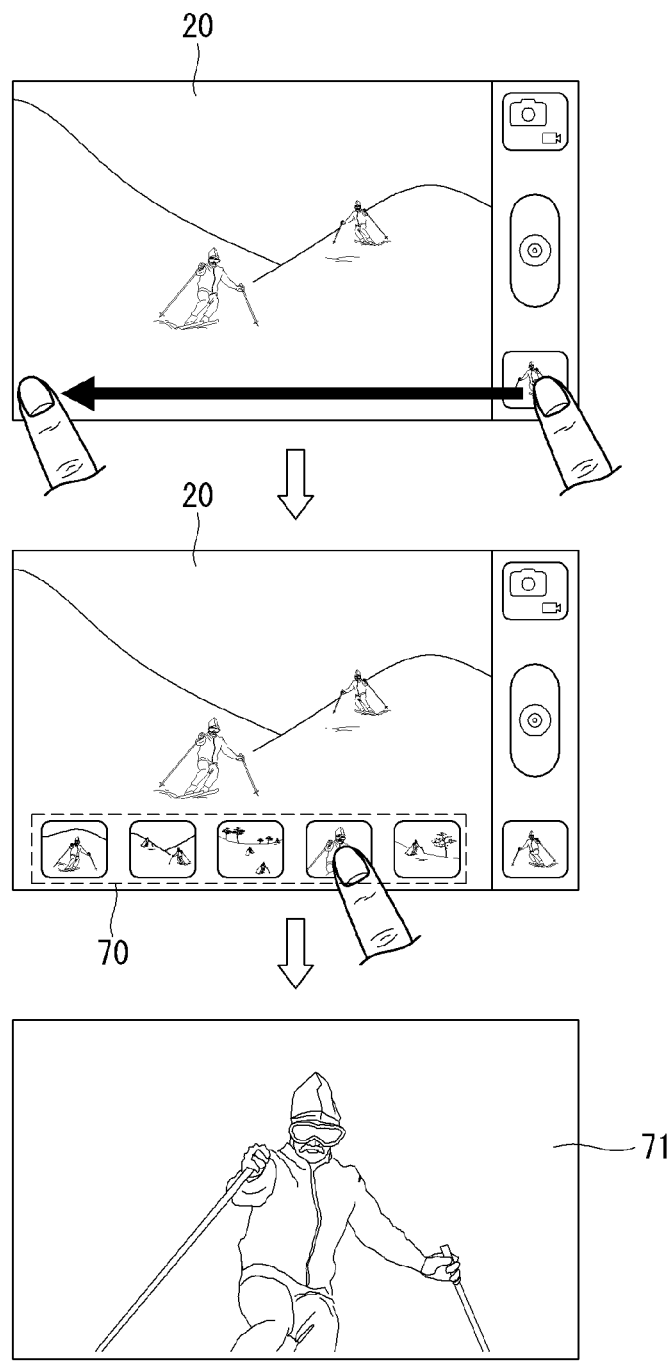

With reference to FIG. 19, when receiving a touch input dragging a thumbnail image to a left direction, the controller 180 displays on the touchscreen 151 at least one thumbnail image 70 corresponding to at least one image stored in the memory 160. If a particular image is selected from the at least one thumbnail, the controller 180 displays an image corresponding to the selected thumbnail image across the entire screen of the touchscreen 151. In other words, according to the third embodiment of the present invention, while the image capture mode is maintained, at least one image captured and stored in the memory 160 can be managed more efficiently.

Figure 20:
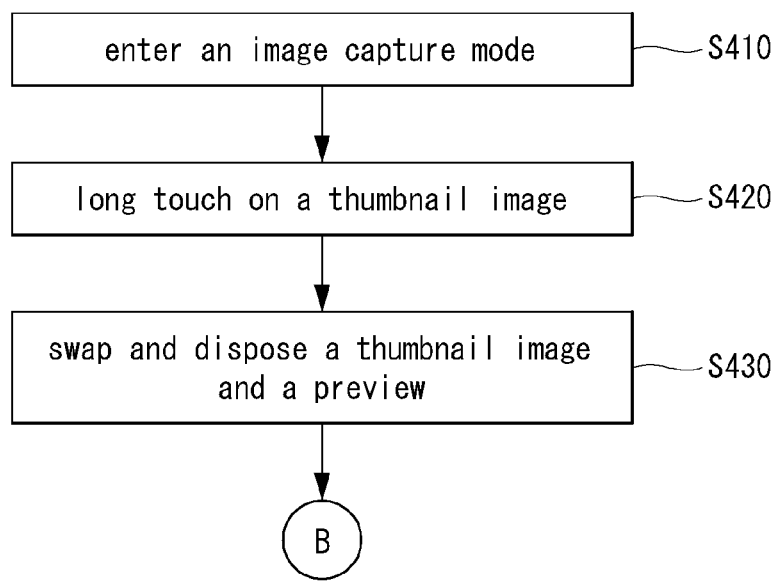
FIG. 20 is a flow chart illustrating a method of controlling a mobile terminal according to a fourth embodiment of the present invention.

Next, FIG. 20 is a flow chart illustrating a method of controlling a mobile terminal according to a fourth embodiment of the present invention. With reference to FIG. 20, the controller 180 enters the image capture mode (S410) and when receiving a touch input predetermined for a thumbnail image (for example, a long touch input) (S420), swaps the thumbnail image and a preview image (S430).

Figure 21:
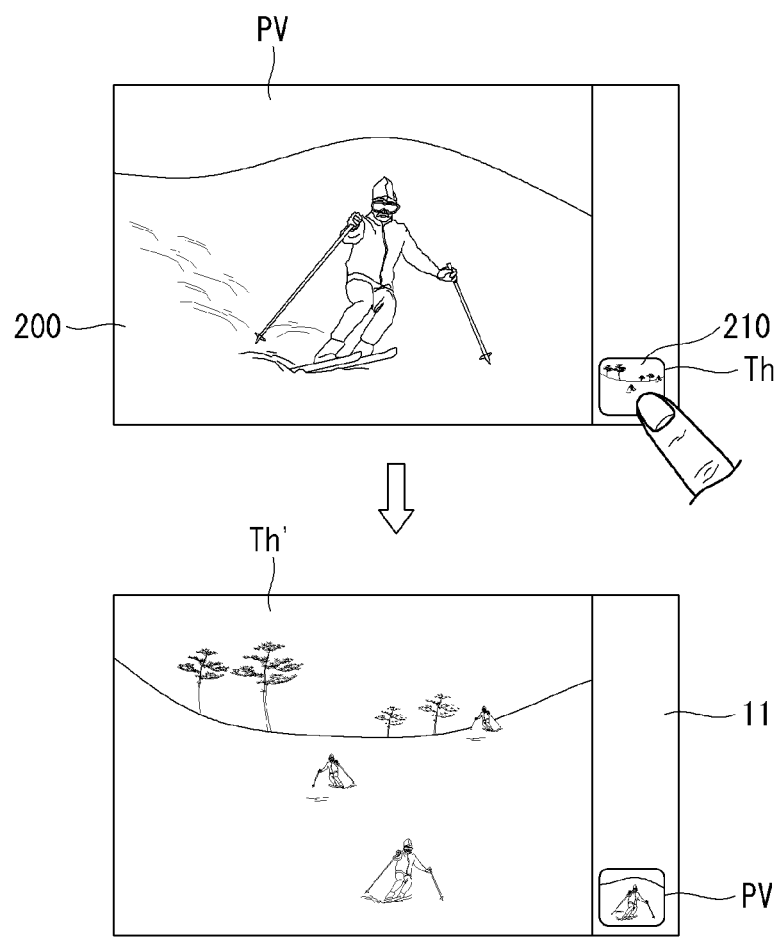
FIGS. 21 to 22 are display screens illustrating a method of controlling a mobile terminal according to the fourth embodiment of the present invention.

In other words, with reference to FIG. 21, if a long touch input is received for a thumbnail image (Th) while a quick viewer (QV) is displayed on the touchscreen 151, a preview image (PV) on is displayed on a first area 200 of the touchscreen 151 and the thumbnail image (Th) is displayed in a second area 210, the controller 180 displays the preview image (PV) on the second area 210 while displaying an image (Th') corresponding to the thumbnail image (Th) on the first area 200.

In this instance, the controller 180 displays the preview image (PV) on the second area 210, and displays a captured image on the first area 200. Accordingly, an additional image capture is made possible based on the preview (PV).

Figure 22:
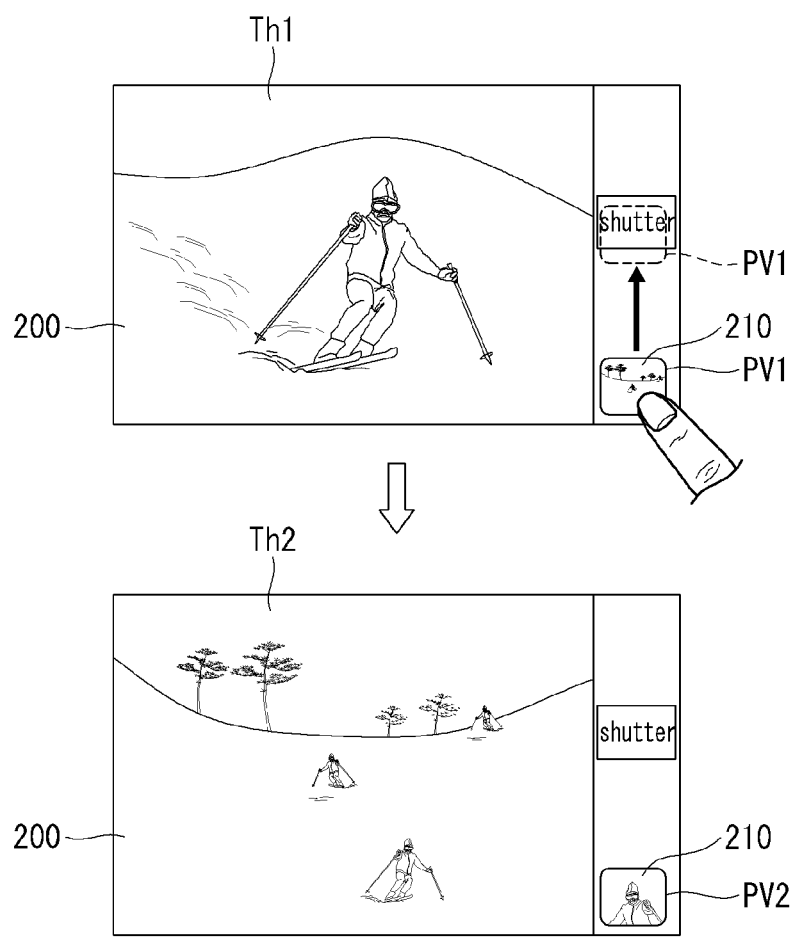

For example, with reference to FIG. 22, while the second area 210 is displaying a preview image (PV1) which is currently input to the camera 121 and the first area 200 is displaying an image (Th1) most recently captured and stored in the memory 160, the controller 180 captures an image and displays the captured image (Th2) on the first area 200 and displays a preview image (PV2) after the image capture on the second area 210, when a touch input dragging the preview image (PV1) to an image capture area (shutter in FIG. 22) is received.

Figure 23:
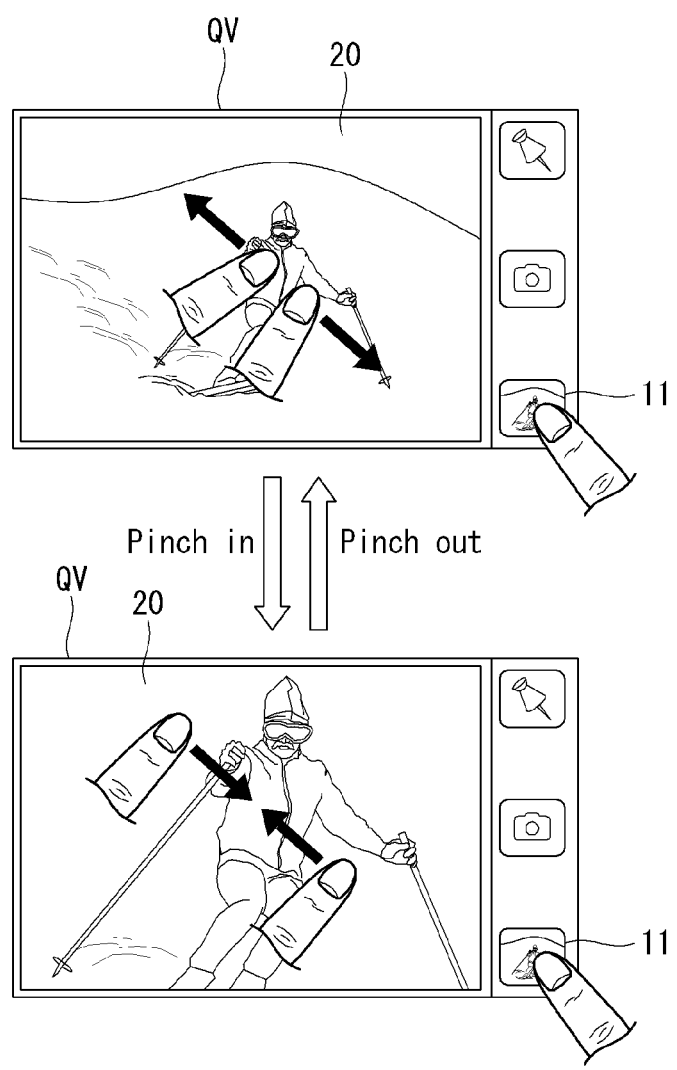
FIGS. 23 to 24 are display screens illustrating an example of adjusting size of a quick view image displayed on a quick viewer according to one embodiment of the present invention.
Figure 24:
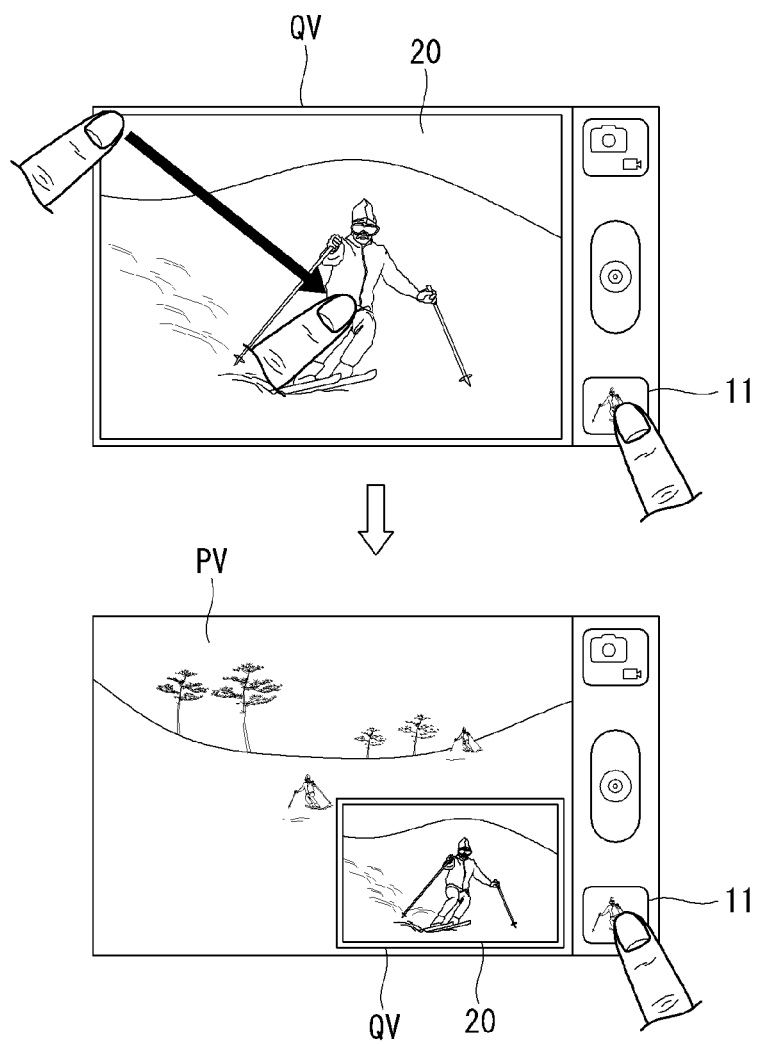

Next, FIGS. 23 to 24 illustrate an example of adjusting a size of a quick view image displayed on a quick viewer according to one embodiment of the present invention. In this example, the controller 180 can adjust size of a quick view image displayed on a quick viewer (QV) through a predetermined touch input.

In particular, with reference to FIG. 23, if a pinch zoom in or pinch zoom out is received for a quick view image 20 displayed on the quick viewer (QV) while a long touch input on a thumbnail image 11 is maintained, the controller 180 magnifies or reduce the size of the quick view image 20.

With reference to FIG. 24, if a touch and drag input is received for one part of the quick view image 20 displayed on the quick viewer (QV) while a long touch input on the thumbnail image 11 is maintained, the controller 180 magnifies or reduce the frame size of the quick viewer (QV) along the drag direction.

The present invention includes the at least the following advantages.

According to one embodiment of the present invention, the user can access a captured image more intuitively through a quick viewer without terminating an image capture mode.

Also, according to one embodiment of the present invention, the user can apply various functions to the captured image by controlling the quick viewer in the image capture mode.

Further, according to one embodiment of the present invention, the user can edit the captured image by controlling the quick viewer in the image capture mode.

Also, according to one embodiment of the present invention, by controlling the quick viewer in the image capture mode and adjusting the preview image while the captured image is displayed in a touchscreen, the user can capture an image immediately.

In addition, the method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD/ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a camera;
a touchscreen;
a memory configured to store at least one image captured through the camera; and
a controller configured to:
enter an image capture mode and display on the touchscreen a preview image obtained through the camera,
display in a predetermined area a thumbnail image of a most recently captured image stored in the memory,
receive a predetermined touch input on the thumbnail image,
display the most recently captured image corresponding to the thumbnail image while maintaining the image capture mode, based on the received predetermined touch input, wherein the most recently captured image is displayed as long as the touch input is maintained on the thumbnail image, and removed when the touch input is released,
when the predetermined touch input includes an input dragging the thumbnail image to an image capture button displayed on the touchscreen, capture the displayed preview image, and
when the predetermined touch input is released, change the thumbnail image in the predetermined area to a new thumbnail image of the captured preview image and display on the touchscreen a new preview image obtained through the camera.

2. The mobile terminal of claim 1, wherein the controller is further configured to display on the touchscreen a quick viewer for displaying the most recently captured image corresponding to the thumbnail image over the preview image.

3. The mobile terminal of claim 2, wherein the quick viewer includes a control area including options for controlling the capture of the preview image, and
wherein the predetermined area including the thumbnail image is included in the control area.

4. The mobile terminal of claim 2, wherein the quick viewer includes at least one soft button corresponding to at least one function for controlling the display of the thumbnail image, and wherein the at least one function includes:
an image capture function for capturing the displayed preview image,
an image share function,
an image delete function,
an image capture function of an image capture extended from an image corresponding to the thumbnail image; and
a voice activating function for activating a speech recognition module for tagging a predetermined voice to most recently captured image corresponding to the thumbnail image.

5. The mobile terminal of claim 2, wherein the thumbnail image includes a video, and when the predetermined touch input is received for the video, the controller is further configured to play the video through the quick viewer.

6. The mobile terminal of claim 1, wherein the predetermined function includes any one of a delete function, a store function, a magnified view function, or a thumbnail image view of another image stored in the memory.

7. The mobile terminal of claim 1, wherein the controller is configured to swap a display position of the preview image and the thumbnail image on the touchscreen.

8. The mobile terminal of claim 1, wherein the controller is further configured to:
display the preview image on a first area of the touchscreen,
display the thumbnail image of the most recently captured image on a second area of the touchscreen, and
display on the touch screen a quick viewer for displaying the thumbnail image across the entire screen of the touchscreen in the image capture mode, when a predetermined touch input is received on the second area.

9. A method of controlling a mobile terminal, the method comprising:
storing, in a memory, at least one image captured through the camera;
entering, via a controller of the mobile terminal, an image capture mode and displaying on a touchscreen a preview image obtained through a camera of the mobile terminal;
displaying, via the controller, in a predetermined area a thumbnail image of a most recently captured image stored in the memory;
receiving, via the controller, a predetermined touch input on the thumbnail image;
displaying, via the controller, the most recently captured image corresponding to the thumbnail image while maintaining the image capture mode, based on the received predetermined touch input, wherein the most recently captured image is displayed as long as the touch input is maintained on the thumbnail image, and removed when the touch input is released;
when the predetermined touch input includes an input dragging the thumbnail image to an image capture button displayed on the touchscreen, capturing the displayed preview image; and
when the predetermined touch input is released, changing the thumbnail image in the predetermined area to a new thumbnail image of the captured preview image and displaying on the touchscreen a new preview image obtained through the camera.

10. The method of claim 9, further comprising:
displaying on the touchscreen a quick viewer for displaying the most recently captured image corresponding to the thumbnail image over the preview image.

11. The method of claim 10, wherein the quick viewer includes a control area including options for controlling the capture of the preview image, and
wherein the predetermined area including the thumbnail image is included in the control area.

12. The method of claim 10, wherein the quick viewer includes at least one soft button corresponding to at least one function for controlling the display of the thumbnail image, and
wherein the at least one function includes:
an image capture function for capturing the displayed preview image,
an image share function,
an image delete function,
an image capture function of an image capture extended from an image corresponding to the thumbnail image; and
a voice activating function for activating a speech recognition module for tagging a predetermined voice to most recently captured image corresponding to the thumbnail image.

13. The method of claim 10, wherein the thumbnail image includes a video, and when the predetermined touch input is received for the video, the method further comprises playing the video through the quick viewer.

14. The method of claim 9, wherein the predetermined function includes any one of a delete function, a store function, a magnified view function, or a thumbnail image view of another image stored in the memory.

* * * * *